US012128703B2

(12) United States Patent
Bichlmeier et al.

(10) Patent No.: US 12,128,703 B2
(45) Date of Patent: Oct. 29, 2024

(54) SECURITY ELEMENT HAVING MACHINE-READABLE IR CODE

(71) Applicant: GIESECKE+DEVRIENT CURRENCY TECHNOLOGY GMBH, Munich (DE)

(72) Inventors: Stefan Bichlmeier, Riemerling (DE); Matthias Pfeiffer, Munich (DE); Gerhard Hampp, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/766,669

(22) PCT Filed: Oct. 16, 2020

(86) PCT No.: PCT/EP2020/025457

§ 371 (c)(1),
(2) Date: Apr. 5, 2022

(87) PCT Pub. No.: WO2021/078406

PCT Pub. Date: Apr. 29, 2021

(65) Prior Publication Data

US 2024/0083190 A1 Mar. 14, 2024

(30) Foreign Application Priority Data

Oct. 24, 2019 (DE) ..................... 10 2019 007 417.3

(51) Int. Cl.
*B42D 25/382* (2014.01)

(52) U.S. Cl.
CPC .................................. *B42D 25/382* (2014.10)

(58) Field of Classification Search
CPC .................................................... B42D 25/382
(Continued)

(56) References Cited

U.S. PATENT DOCUMENTS 4,044,231 A 8/1977 Beck et al.
6,926,764 B2 8/2005 Bleikolm et al.
(Continued)

FOREIGN PATENT DOCUMENTS

AT 413805 B 6/2006
DE 19907697 A1 8/2000
(Continued)

OTHER PUBLICATIONS

International Search Report and Written Opinion from PCT Application No. PCT/EP2020/025457, Feb. 2, 2021.

*Primary Examiner* — Allyson N Trail
(74) *Attorney, Agent, or Firm* — Workman Nydegger

(57) ABSTRACT

The invention relates to a security element having an optically variable security feature and a machine-readable security feature, which are at least partially arranged one above the other, wherein the security element is transparent or translucent in the region of the visible light and the machine-readable security feature forms a code. The machine-readable security feature is a combination of at least two different substances, a first IR substance and a second IR substance, wherein the first IR substance is arranged in a first areal region of the security element and the second IR substance is arranged in a second areal region of the security element, and wherein the first IR substance absorbs in a first IR wavelength region and the second IR substance absorbs in a second IR wavelength region. The invention also relates to a value document which has such a security element.

14 Claims, 7 Drawing Sheets

(58) Field of Classification Search
USPC .......................................................... 235/491
See application file for complete search history.

(56) References Cited

U.S. PATENT DOCUMENTS

| | | | | |
|---|---|---|---|---|
| 7,040,663 | B1 | 5/2006 | Plaschka et al. | |
| 7,728,931 | B2 * | 6/2010 | Hoffmuller .......... | B42D 25/364 349/187 |
| 8,778,481 | B2 | 7/2014 | Kaule et al. | |
| 2005/0067489 | A1 | 3/2005 | Jones et al. | |
| 2008/0160226 | A1 | 7/2008 | Kaule et al. | |
| 2017/0351014 | A1 * | 12/2017 | Matsumura ....... | H01L 27/14627 |
| 2018/0188428 | A1 * | 7/2018 | Arimura ................ | G02B 5/223 |
| 2018/0229536 | A1 | 8/2018 | Gettens et al. | |
| 2019/0158796 | A1 * | 5/2019 | Wang ..................... | H04N 23/88 |
| 2019/0302332 | A1 * | 10/2019 | Lee ........................ | G02B 5/223 |
| 2020/0150586 | A1 * | 5/2020 | Holmes ................ | B42D 25/328 |
| 2020/0384792 | A1 * | 12/2020 | Thony .................. | B42D 25/309 |

FOREIGN PATENT DOCUMENTS

| | | | |
|---|---|---|---|
| EP | 2853411 | A1 | 4/2015 |
| EP | 2977935 | A1 | 1/2016 |
| EP | 3459756 | A1 | 3/2019 |
| GB | 2168372 | A | 6/1986 |
| JP | 2012022381 | A | 2/2012 |
| WO | 2006087138 | A1 | 8/2006 |
| WO | 2007060133 | A1 | 5/2007 |
| WO | 2017097430 | A1 | 6/2017 |
| WO | 2018072881 | A2 | 4/2018 |

* cited by examiner

SECURITY ELEMENT HAVING MACHINE-READABLE IR CODE

BACKGROUND

The invention relates to a security element having an optically variable security feature and a machine-readable security feature, which are arranged one above the other, the security element being transparent or translucent in the region of the visible light at least in partial regions and the machine-readable security feature forming a code, and to a value document which has the security element.

Value documents are equipped with security elements which allow a check of the authenticity of the value document and serve as protection against forgery. Value documents are in particular bank notes, shares, identity documents, credit cards, deeds, insurance cards and documents generally at risk of forgery, for example also product authentication elements such as labels and packaging for high-value products. The term "value document" as used herein comprises not only finished value documents fit for circulation, but also precursors of value documents, such as security papers, which do not have all the features of a value document fit for circulation, for example also security papers in sheet or roll form.

Security elements generally have the form of threads, strips or patches which are applied onto or incorporated at least partly into a value document, for example window security threads and pendulating security threads, or which are used to cover through openings in a value document. Security elements themselves may also represent a value document, for example a polymer bank note.

Security elements have one or more security features, i.e. constituents with visually checkable and/or machine-checkable properties by which the authenticity of a document or of another object can be determined.

Of increasing importance are security features with optically variable properties, i.e. the appearance of the security feature varies depending on the viewing angle. Continuously changing the viewing angle creates a movement effect. Optically variable security features are considered to be very forgery-proof because the movement effects cannot be produced by usual printing processes and cannot be "copied along" when a security element is photocopied. Examples of optically variable security features are micro-optical security features such as moiré magnifiers, holograms and thin-film elements.

The authenticity of value documents should not only be checkable visually, but also by machine. Checkability by machine offers a high level of security and is also mandatory in many cases, for example in bank note processing. Devices such as automatic counting machines and vending machines must be able to recognize denominations and to check the authenticity of a bank note.

Until now, magnetic security features have typically been used for checking the authenticity by machine. However, magnetic materials have the disadvantage that they have a strong inherent color, which is why they are easily visible in both incident light and transmitted light. Therefore, they may impair the appearance of other security features. In particular in the case of optically variable security features and security features to be viewed in transmitted light, they have a very disturbing effect. On the other hand, materials of other security features, for example metallizations of holograms, can also interact with magnetic security features or impair the readability thereof.

Therefore, there is a need for a security element that has a high degree of forgery resistance and can be checked for authenticity both visually and by machine.

In particular, there is a need for a security element that has both a security feature with optically variable properties and a security feature that forms a machine-readable code.

The optically variable security feature and the machine-readable security feature should not have a disturbing influence on each other, i.e. neither the visual appearance and visual effects of the optically variable security feature should be impaired by the machine-readable security feature, nor should the readability of the machine-readable code be disturbed by the visually checkable security feature.

SUMMARY

The invention satisfies this need by a machine-readable security feature that forms a code using at least two mutually different IR substances which are arranged in a defined manner in the security element. Two different IR substances are understood to be two substances that absorb in different IR wavelength regions.

The present invention provides a security element having an optically variable security feature and a machine-readable security feature, which are arranged at least partly one above the other, the security element being transparent or translucent to wavelengths of visible light at least in the region in which the optically variable security feature is located, and the machine-readable security feature forming a code. At least in the region in which the machine-readable security feature is located, the security element must be sufficiently transparent to the respective IR radiation wavelength in order to ensure the readability of the machine-readable security feature. The machine-readable security feature is a combination of a first IR substance, i.e. a substance that absorbs in a first IR wavelength region, and a second IR substance, i.e. a substance that absorbs in a second IR wavelength region. The first IR wavelength region and the second IR wavelength region are different from each other and distinguishable by machine. The first IR substance is located in a first areal region of the security element, and the second IR substance is located in a second areal region of the security element, the first areal region and the second areal region not being identical. The areal regions can each be divided into partial regions, whereby both first IR substance and second IR substance can be located in individual partial regions.

The distinction between a first and a second IR substance, a first and a second IR wavelength region, and a first and a second areal region is arbitrary and should be understood in the sense of "one" or "another".

Likewise, terms such as "a" and "one" are to be understood in the sense of "at least a" and "at least one", respectively.

A security element is considered transparent to visible light, if a viewer can recognize what is located behind the security element. Security elements or regions of security elements that allow light to pass through but do not reveal any objects behind them are considered translucent.

The present invention enables a multicoding, which is achieved by using more than one IR substance in combination with arrangement variants of the more than one IR substance.

Each of the at least two IR substances used generates a characteristic IR signature, i.e. an absorption spectrum that can be used to unambiguously characterize the respective IR substance. For example, the wavelengths of absorption maxima and/or absorption minima, the width of the absorption maxima and/or absorption minima, the slope or the change of the slope of a spectrum, as well as, in the case of several absorption maxima or absorption minima, their distance from each other and/or their relative height to each other can be evaluated.

In addition, the at least two IR substances can be distributed in a variety of ways over the area of the security element and in particular over the region of the security element in which the optically variable security feature is located. Exemplary arrangement variants are a distribution of the IR substances in such a way that regions with IR substance and regions without IR substance result, the regions with IR substance having at least partly different IR substances; a distribution in such a way that the regions with IR substance are separated from each other or overlap each other; a distribution in such a way that each region with IR substance contains only one IR substance or a mixture of IR substances; a distribution in such a way that the regions with IR substance have different concentrations of IR substance, either within one single region or varying from region to region; and a combination of the mentioned arrangement variants. Alternatively or additionally, the IR signature of one or more regions with IR substance can be changed by measures such as a partial or complete overprinting with a non-IR-permeable layer and/or by mixing the IR substance (s) with IR-absorbing substances.

IR substances suitable for the purposes of the present invention must fulfil particular requirements.

On the one hand, the combinations of IR substances used must be coordinated to each other in such a way that they are distinguishable from each other by machine. On the other hand, each of the IR substances used should preferably fulfil a series of requirements. This includes primarily that the presence of the IR substance should not disturb the perceptibility of the optically variable security feature. Therefore, the IR substances used should be transparent in the visible wavelength region (in the wavelength region from 400 nm to 700 nm). Sufficient transparency is present when the CIE (1976) brightness value at diffuse reflection (L*) is higher than 70 (measured on the pure IR substance powder). Preferably, the value is higher than 80.

For reasons of good detectability, it is preferred that the IR substances absorb as strongly as possible in the IR region (in the wavelength region from more than 700 nm to 2500 nm). Particularly desirable is a strong absorption in the near infrared region (NIR region), i.e. in the wavelength region from more than 700 nm to 1100 nm. This region is easily accessible with silicon photodetectors that are sensitive up to a wavelength of 1100 nm.

Further, IR substances with broadband absorption in the IR region are preferred over IR substances with narrowband absorption. The reason for this is that in the IR region there is no IR color standard comparable to the CIELAB standard. Therefore, the values, which are measured for a particular absorption of an IR substance with different detectors, may vary. The deviations are not significant in the case of rather broadband absorptions, but are striking in the case of very narrowband absorptions and could lead to a false evaluation of the measurement values measured with different detectors.

Examples of suitable IR substances are stated in the print WO2007/060133 A1. Particularly suitable are iron (II) and copper (II) compounds with a $Fe^{2+}$ ion or a $Cu^{2+}$ ion in a suitable chemical environment, a suitable chemical environment being, for example, a phosphate ion or a polyphosphate ion or, more generally, a phosphorus- and oxygen-containing group. These IR substances broadband-absorbing in the NIR region (700 nm to 1100 nm) are transparent in the visible region (400 nm to 700 nm) of the electromagnetic spectrum, and they have at most a slightly yellowish or bluish tint.

Particularly preferred are pigments of the printing inks sold by SICPA (SICPA SA, Ave de Florian 41, 1008 Prilly, Switzerland) under the trade name SICPATALK. These printing inks have been found to be particularly well suited for the purposes of the present invention. SICPATALK® CBA and SICPATALK® NFB, which are both nearly colorless and therefore substantially invisible to a viewer, have proven to be particularly suitable.

As further suitable IR substances there can be mentioned, by way of example, LUMOGEN-S from BASF Corporation, 100 Park Ave, Florham Park, NJ 07932, the IR absorbing materials disclosed in GB 2 168 372 which are invisible or transparent in the visible region of the electromagnetic spectrum, and the IR marking substances disclosed in U.S. Pat. No. 6,926,764. These IR-marking substances are substituted phthalocyanines, naphthalocyalines, metal-containing phthalocyanines or poly-substituted phthalocyanines. Preferred are thiophenol-substituted copper phthalocyanines, in particular para-toluenethiol-persubstituted copper phthalocyanines.

The type of application of the IR substances is in principle not limited in any way, but is preferably effected by formulation as printing inks, the inks being particularly preferably applied by intaglio printing method. The intaglio printing process has the advantage that inks with a high solids content can be used. This allows the use of IR substances which have only weak IR absorptions in the desired region, as they can be utilized in high concentrations and thus generate sufficiently strong signals.

Suitable concentrations of IR substance are in the region of 5 to 70 wt. %, preferably 10 to 50 wt. %, and particularly preferably 20 to 50 wt. %, related to the weight of the ink as a whole. Besides, the usual printing ink components, in particular intaglio printing ink components, which are known to a person skilled in the art, can be used.

When applying the IR substances by intaglio printing method, one must be careful that the particle sizes do not exceed an average of 50 μm, preferably 20 μm, and particularly preferably 10 μm. There should be no particles larger than 100 μm, as such particles can be wiped out of the engraving of the printing plate.

The multicoding according to the invention using at least two different IR substances (substances that absorb in the IR region, but at different wavelengths or in different wavelength regions) can in principle be employed for any type of security element that is sufficiently transparent in the relevant IR wavelength region in order to allow detection of the IR substances, but said multicoding is particularly advantageous for those security elements in which visually clearly perceptible substances, such as strongly colored substances, and/or magnetic substances cannot be employed. These are, in particular, security elements with optically variable security features, which include, for example, moiré magnifiers.

Moiré magnifiers are multilayer constructions which include a focusing layer such as a lens arrangement, an image layer with an arrangement of image elements, and typically also a spacer layer between the lens layer and the image layer. The image elements are magnified or otherwise optically altered when viewed through the lenses. Further functional layers and/or auxiliary layers may be present in addition. The construction, materials and manufacture of security elements with optically variable security features such as lens-based security features are known to a person skilled in the art. In this respect, reference is made to the explanations in the prints WO 2006/087138 A1, EP 2 853 411 A1, WO 2017/097430 A1 and WO 2018/072881 A2.

Other optically variable security features with which the multicoding according to the invention can be combined in a particularly advantageous manner are, for example, holograms and thin-film elements. The multicoding according to the invention can also be advantageously combined with transparent liquid crystal layers.

As a special example, so-called LEAD (Longlasting Economical Anticopy Device) security elements should be mentioned. These security elements have functional layers on a carrier foil, such as an embossing lacquer layer with a holographic security feature, metallized layers with colored or fluorescent imprints, layers with motifs that can be recognized in transmitted light, etc. This functional layer structure also comprises auxiliary layers such as print-receiving layers, adhesion-promoter layers or protective layers. LEAD security elements are available as T-LEAD security elements and as L-LEAD security elements. T-LEAD security elements are configured as transfer elements, i.e. a transfer foil is removed after the transfer to the value document. L-LEAD security elements contain a foil that is transparent at least in the wavelength region of visible light and remains in the security element structure. L-LEAD security elements are preferably used to cover through openings in value documents.

The multicoding according to the invention is also suitable for being employed in such multilayered security elements. It is only necessary to ensure that the IR substances are provided in a layer that is not covered by IR-absorbing materials. In general, it applies to all security elements that have a multicoding according to the invention that the materials used must be transparent to the detection wavelengths in the detection wavelength region of the multicoding. However, a lack of transparency of certain layers to the detection wavelengths can also be deliberately used to make particular parts of the code recognizable only under respectively defined conditions. For example, one part of the code could only be detectable upon a check on one of the surfaces of a value document, while the other part of the code could only be detected upon a check on the other surface of the value document.

Security elements are areal materials. They may have one or several optically variable security features, where an optically variable security feature may extend over a part of the area of the security element or over the entire area of the security element. The same applies to the machine-readable security feature. It also extends over a part of the area or over the entire area of the security element, the region of extension of the machine-readable security feature being hereinafter referred to as the “coding region”, while the region of extension of the optically variable security feature is hereinafter referred to as the “optically variable region”.

The coding region and the optically variable region are arranged in such a way that they at least partially overlap each other when viewed in a plan view of the security element. Alternatively, they can also be arranged completely or at least largely congruent.

In order to achieve as many diverse coding variants as possible, it is provided according to the invention that the coding region is structured in different ways. This results in numerous coding possibilities, the number of which can be further increased by variations in the region of IR substances and/or the use of further substances or suitable printing techniques to further structure individual regions.

In the following, some design variants of the coding region are stated by way of example:

One of the IR substances (a first IR substance) is located in a first areal region of the security element and another IR substance (a second IR substance) is located in a second areal region of the security element, the first areal region and the second areal region not being identical.

The first areal region and/or the second areal region can be divided into partial regions.

The first areal region and the second areal region or parts thereof may have the same or different dimensions and the same or different geometric shapes.

The first areal region and the second areal region or partial regions thereof may border on each other or be spaced apart from each other, in particular separated from each other by regions without IR substance.

Partial regions of the first areal region and the second areal region can be arranged strictly alternating, or partial regions of the same areal region may follow each other.

Hereinafter, exemplary design variants are explained in more detail in connection with FIGS. 3A to 3H.

The number of coding possibilities can be further increased by using three or more different IR substances, or by using one or several UV-absorbing substances in addition to the IR substances, or by mixing two or more IR substances within an areal region or a partial region of an areal region, or by arranging areal regions or partial regions of areal regions to overlap each other, or by equipping areal regions or partial regions of areal regions with a non-uniform distribution of the IR substance(s), or by equipping particular areal regions or partial regions of areal regions with an IR-absorbing coating. Some of these variants are described in more detail in connection with FIGS. 4A to 4C.

Of course, it is also possible to carry out two or more of the above-mentioned measures in combination.

Regions with a non-uniform distribution of the IR substance can be obtained, for example, by printing the IR substance by means of a printing plate with regions of different engraving depth. Regions with deeper engraving take up more ink with IR-absorbing substance and transfer it to the security element.

With regard to the arrangement of the machine-readable security feature in the vertical layer construction of a security element, several variants are likewise possible.

On the one hand, the coding can be provided either in one or in several layers of the security element, either in a separate coding layer or in separate coding layers which serve exclusively for coding, or in one or several layers of the security element which also serve another purpose, for example in an adhesive layer, in an embossing lacquer layer, or in a protective lacquer layer.

On the other hand, the first and the second IR substance may be provided either both at the front side of the security element or both at the back side of the security element or one of the IR substances may be provided at the front side of the security element and the other one of the IR substances may be provided at the back side of the security element. The front side of a security element is considered to be the surface of the security element, at which the optically variable effect of the optically variable security feature is most recognizable. Accordingly, the back side of a security element is the surface of the security element opposing the front side.

The attachment of the machine-readable code to the front side or the back side of a security element is not to be understood as meaning that the coding substances must necessarily be located on a surface of the security element.

They can also be located inside the layer construction of the security element, but closer to the front side or closer to the back side, so that the detection thereof is better from the front side or better from the back side.

Whether the complete machine-readable code can be detected on one side of the security element or whether respectively only a part of the machine-readable code can be detected on each side of the security element, can be controlled by the arrangement of the IR substances in the security element as well as by the transparency of the materials that the detection radiation must penetrate. Some exemplary arrangements of the machine-readable code are described in connection with FIGS. 5A to 5E.

The invention will hereinafter be explained more closely with reference to drawings. The Figures respectively represent exemplary embodiments, which should in no way be understood as limiting the invention in any way. Furthermore, the Figures are merely schematic representations which do not reflect the real proportions, but only serve as illustrations. In each case, only the features essential to an understanding of the invention are represented, and it is understood that in each embodiment further features may be present.

BRIEF DESCRIPTION OF THE DRAWINGS

Furthermore, features which are represented in different Figures may be present in combination with each other.

The same reference numbers designate respectively the same or similar elements.

Figure 1:
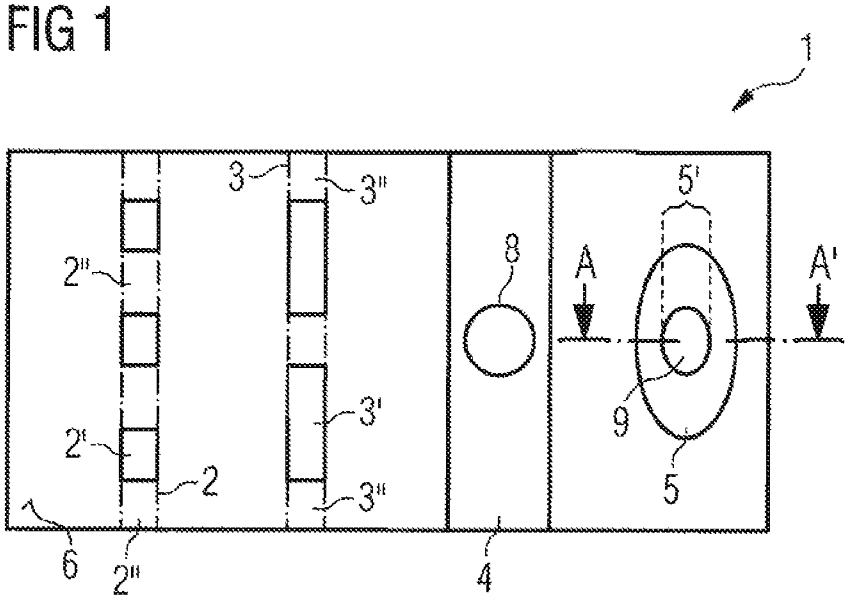
Figure 2:
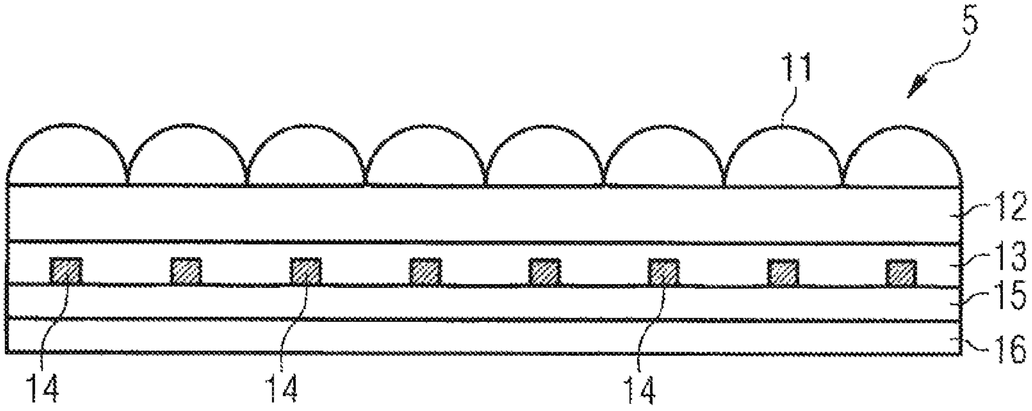
Figure 3A:
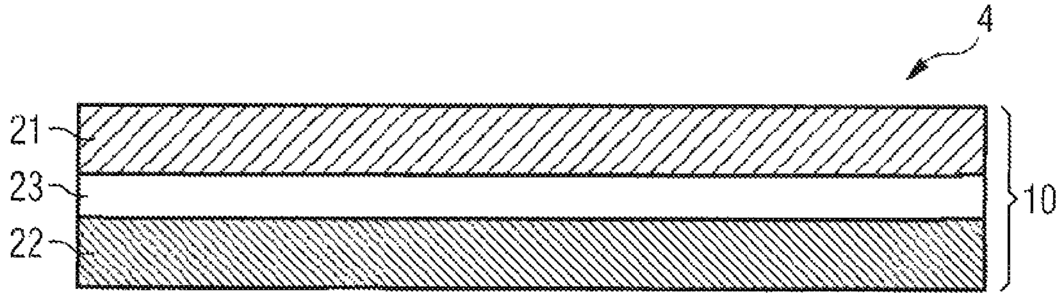
Figure 3B:
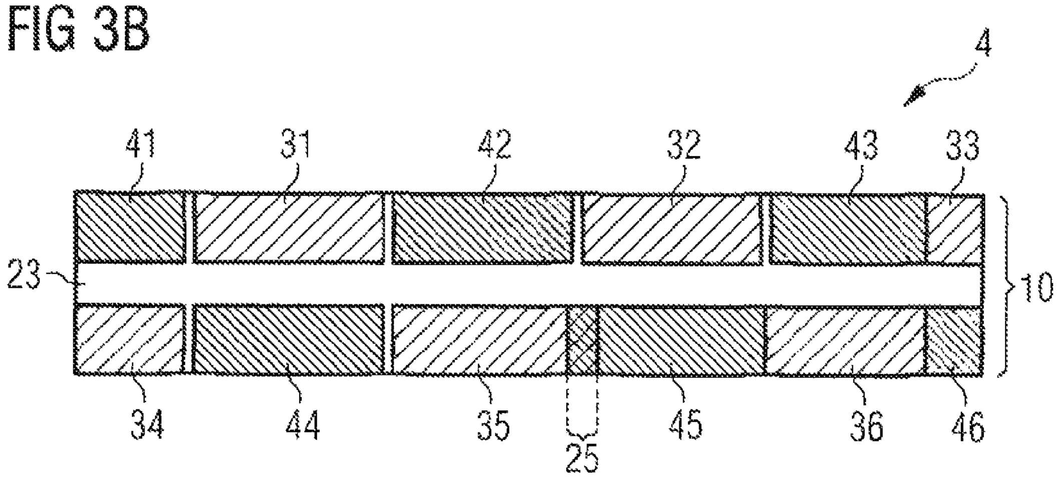
Figure 3C:
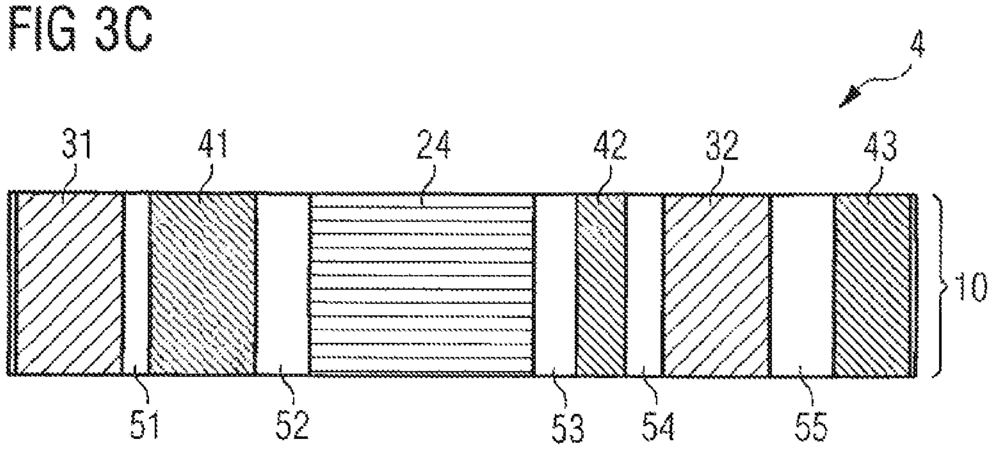
Figure 3D:
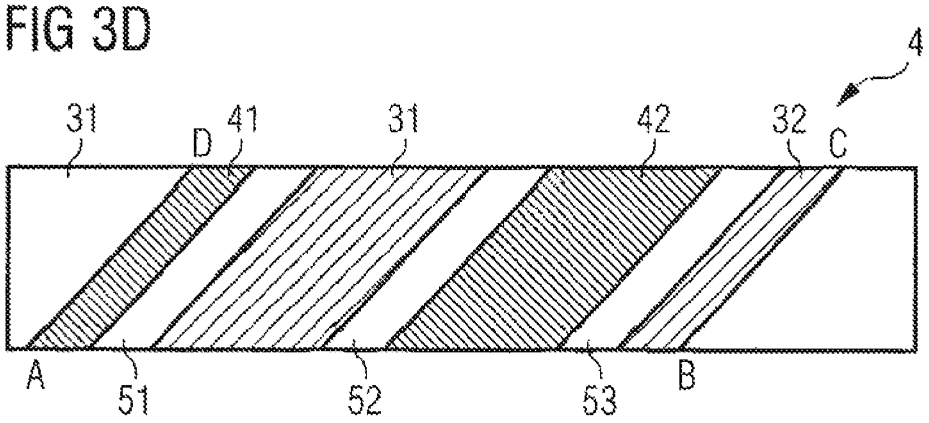
Figure 3E:
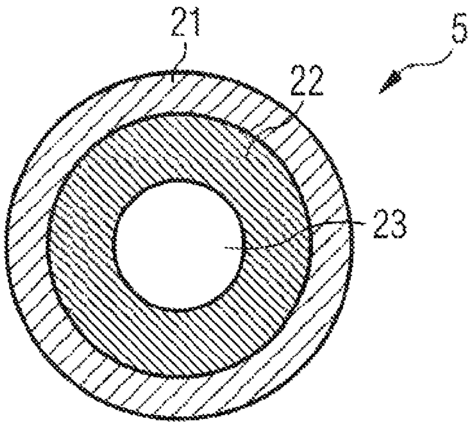
Figure 3F:
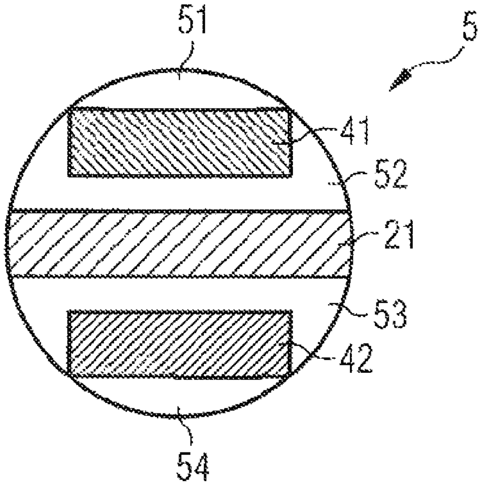
Figure 3G:
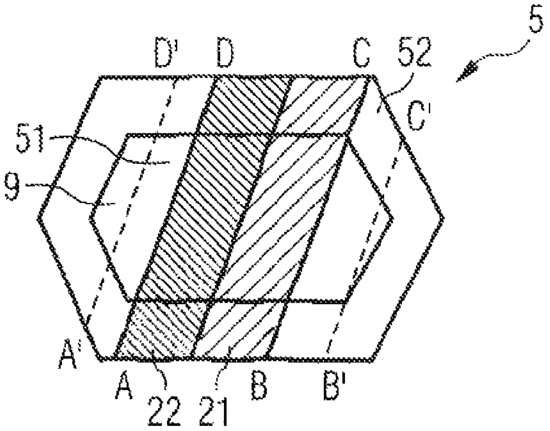
Figure 3H:
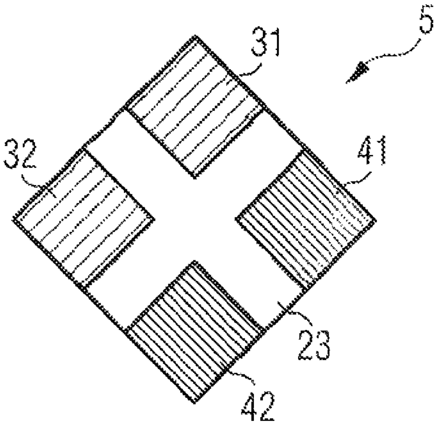
Figure 4A:
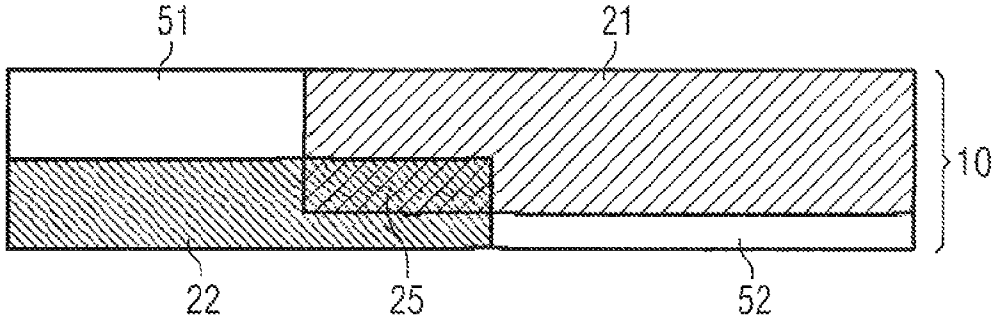
Figure 4B:
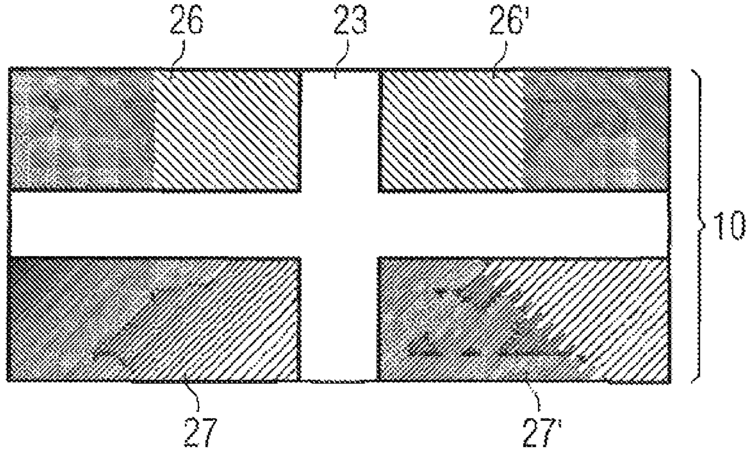
Figure 4C:
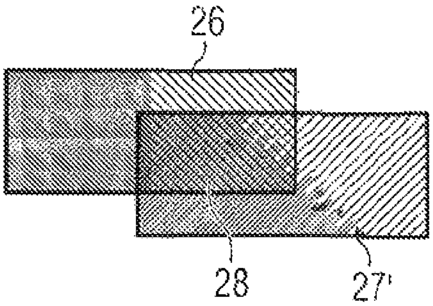

There are shown:

FIG. 1 an embodiment of a value document according to the invention in a plan view, FIG. 2 a security element having an optically variable security feature according to the prior art in cross-section, FIGS. 3A to 3D embodiments of coding regions of security elements (strips) according to the invention in a plan view, FIGS. 3E to 3H embodiments of coding regions of security elements (patches) according to the invention in a plan view, FIGS. 4A to 4C embodiments of coding region structurings of security elements according to the invention in a plan view, and FIGS. 5A to 5E embodiments of security elements according to the invention having optically variable security feature and machine-readable security feature in cross-section.

DETAILED DESCRIPTION OF VARIOUS EMBODIMENTS

FIG. 1 shows a value document 1 according to the invention in a plan view of a surface 6 of the value document. The represented value document 1 has four security elements according to the invention, a pendulating security thread 2, a window security thread 3, a foil strip 4 and a foil patch 5. The pendulating security thread 2 is incorporated in the value document 1 in such a way that it is partly visible on one surface of the value document and partly visible on the other surface of the value document. In FIG. 1, the regions visible on the represented surface 6 (hereinafter referred to as the upper side) are referred to by the reference sign 2', while the regions visible on the opposite surface (hereinafter referred to as the underside of the value document) are referred to by the reference sign 2". The window security thread 3 has visible regions 3' on the upper side 6 of the value document and regions 3" embedded in the value document substrate. The foil strip 4 is completely attached to the upper side 6 of the value document and covers an opening 8 that passes completely through the value document substrate. The foil patch 5 is also completely attached, for example glued, to the upper side 6 of the value document 1.

Each of the security elements 2, 3, 4 and 5 may be equipped with a combination of an optically variable security feature and a machine-readable security feature which forms a code in the manner according to the invention. In the represented embodiment, the foil patch 5 is equipped with an optically variable security feature 9, for example a moiré magnifier. A machine-readable security feature (not represented in the Figure) is arranged in the foil patch 5 in such a way that it at least partially overlaps the optically variable security feature 9.

Optically variable security features are often arranged over openings that pass through the value document, such as the represented opening 8. They can thus be viewed in incident light as well as in transmitted light, whereby different representations can be recognizable to a viewer depending on the optically variable security feature. When viewing an optically variable security feature in transmitted light, additional security features that overlay the optically variable security feature can have a particularly disturbing effect on its appearance. However, the coding according to the invention remains hidden from a viewer even when viewed in transmitted light.

In the case of the pendulating security thread 2 and the window security thread 3, the optically variable security feature is located either in the regions 2' visible on the upper side 6 of the value document or in the regions 2" of the pendulating security thread or in the regions 3' of the window security thread visible on the underside 7 of the value document. The machine-readable security feature is also located, at least in part, in these regions, but may also extend into regions in which there is no optically variable security feature, for example also into the regions 3" of the window security thread embedded in the value document substrate. However, care must be taken that the detectability of the IR substances is guaranteed, i.e. in the case of an embedding, the value document substrate must be sufficiently transparent in the absorption region of the IR substances.

FIG. 2 shows a security element having an optically variable security feature according to the prior art in cross-section. Represented is a cross-section through a foil patch 5 as shown in FIG. 1, more precisely a cross-section through a partial region 5' along the line A-A', but without a machine-readable security feature according to the invention. The prior art security element 5 is a moiré magnifier having a layer of microlenses 11, an image layer 13, a spacer layer 12 between the image layer 13 and the microlenses 11, a functional layer 15 which may contain, for example, a magnetic security feature, and an adhesive layer 16 for attachment to a value document. In the represented embodiment, the image layer 13 consists of an embossing lacquer in which microdepression are embossed. These microdepressions are filled with a colored substance and form the image elements 14, so-called microimages. The microlenses 11 and the microimages 14 respectively form a two-dimensional arrangement. The microimages 14 are magnified or otherwise optically altered when viewed through the microlenses 11. The image layer 13 and the layer having the focusing elements 11 together form the optically variable security feature.

Security elements according to the invention differ from the security elements of the prior art, such as the security element represented in FIG. 2, in that they have, in addition to the optically variable security feature, a particular machine-readable security feature which forms a code and which (in a plan view of the security element) at least partially overlaps the optically variable security feature. According to the invention, the machine-readable security feature is a combination of at least two substances which both absorb in the IR wavelength region, but in different manners so that they can be distinguished from each other by machine. According to the invention, these IR substances are arranged in a structured manner so that a machine-readable code is formed. Various structuring variants are represented in FIGS. 3A to 3H and FIGS. 4A to 4C.

FIGS. 3A to 3H respectively show plan views of the machine-readable security feature of security elements according to the invention in the form of foil strips. In the represented embodiments, the machine-readable code extends over substantially the entire area of the security element, i.e. the machine-readable security feature occupies substantially the entire area of the security element. This is not necessarily the case. Rather, the coding region may extend over only a part of the area of the security element. This applies analogously to the optically variable security feature, whose region of extension represents the optically variable region. In typical foil security elements, the optically variable security features usually extend over a substantially smaller region than the machine-readable security features. Due to the relatively large space requirements of machine-readable security features, an overlap between optically variable security feature and machine-readable security feature can hardly be avoided.

FIG. 3A represents a simple embodiment of a machine-readable security feature according to the invention. The coding region 10 consists of a first areal region 21 in which the first IR substance is located, a second areal region 22 in which the second IR substance is located, and a third areal region 23 without IR substance which separates the first areal region 21 and the second areal region 22 from each other. All areal regions extend over the entire length and a part of the width of the security element strip and are inherently unstructured.

A more complex structuring variant is represented in FIG. 3B. Here, the first areal region in which the first IR substance is located is divided into partial regions 31, 32, 33, 34, 35 and 36, and the second areal region in which the second IR substance is located is divided into partial regions 41, 42, 43, 44, 45 and 46. The individual partial regions are respectively arranged alternately, and they are partly separated from each other by IR-substance-free regions. The partial regions 43 and 33 directly border on each other, like the partial regions 45, 36, 46. There is also a region 25 in which the partial region 35 of the first areal region and the partial region 45 of the second areal region are arranged overlapping each other. Such an overlap region 25 can be formed, for example, by overprinting the partial region 35 with the partial region 45.

In the embodiment of the coding region 10 represented in FIG. 3C, the first areal region having the first IR substance is divided into partial regions 31, 32, and the second areal region having the second IR substance is divided into partial regions 41, 42, 43. In addition, there is an areal region 24 in which there is present a mixture of the first IR substance and the second IR substance. The regions containing IR substance respectively have the shape of more or less wide strips extending transversely to the longitudinal axis of the security element. The regions containing IR substance are separated from each other by regions 51, 52, 53, 54, 55 which do not contain any IR substance.

FIG. 3D shows a coding region in the form of a parallelogram with the corner points A, B, C, D. The first areal region having the first IR substance is divided into partial regions 31, 32, and the second areal region having the second IR substance is divided into partial regions 41, 42, whereby the partial regions containing IR substance are separated from each other by the regions 51, 52, 53 which do not contain any IR substance. The individual partial regions have a beam shape, as in the representation of FIG. 3C, but run obliquely to the longitudinal axis of the security element 5.

In FIGS. 3E to 3H, the coding regions of differently shaped foil patches 5 are represented.

FIG. 3E shows a circular foil patch 5 whose coding region extends over the entire area of the foil patch. The areal region 21 having the first IR substance and the areal region 22 having the second IR substance form concentric circles around the circular region 23 which does not contain any IR substance.

In FIG. 3F, there is also represented a circular foil patch. In this patch 5, the coding region is structured such that it has three beam-shaped areal regions having IR substance. The first IR substance is contained in the first areal region 21, and the second IR substance is contained in the areal regions 41, 42. The areal regions 41 and 42 are arranged on both sides of the areal region 21, whereby areal regions 51, 52, 53, 54 which do not contain any IR substance also remain in the coding region.

The embodiment of a security element 5 according to the invention represented in FIG. 3G has the shape of a hexagonal foil patch. The coding region has the shape of a parallelogram with the corner points A, B, C, D. This coding region is filled by a first areal region 21 having the first IR substance and the second areal region 22 having the second IR substance. Both areal regions have approximately the same dimensions and border on each other. In this case, for checking the authenticity of the security element, the two IR substances can be used, i.e. their absorption spectra, as well as the position within the parallelogram A, B, C, D. If the checking region is extended to a coding region having the corner points A', A, B, B', C', C, D, D', the regions 51, 52 can additionally be used for the check, i.e. it can be checked whether the regions 51, 52 are free of IR-absorbing substance.

In FIG. 3G also the position of an optically variable security feature 9 is drawn, which, like the foil patch itself, has a hexagonal shape. As can be seen from FIG. 3G, the optically variable security feature 9 and the machine-readable security feature, i.e. the coding region 10 are partially congruent. It is therefore important that the presence of the machine-readable security feature does not have an influence on the appearance of the optically variable security feature. In addition, it is also important that the optically variable security feature does not impair the readability of the machine-readable security feature. In the case of a machine-readable security feature based on the detection of IR absorption, a problem-free read-out is possible as long as either all materials lying in the radiation path are transparent in the wavelength region in question or the machine-readable security feature within the security element is arranged such that no materials absorbing in the detection wavelength region are located between the machine-readable security feature and the detection apparatus.

FIG. 3H shows a security feature in the form of a square foil patch 5. In this embodiment, the coding region consists of two square areal regions 31, 32 having a first IR substance and two square areal regions 41, 42 having a second IR substance, the regions having IR substance being separated from each other by a cross-shaped region 23 without IR substance.

It is understood that the coding regions represented in FIGS. 3E to 3H can also be provided on security elements with geometric shapes other than those represented in the Figures, for example on strip-shaped security elements.

FIGS. 4A to 4C illustrate possibilities as to how the complexity of a coding can be increased without increasing the number of IR substances which are required for the coding.

In the embodiment represented in FIG. 4A, the coding region 10 has five areal regions, an areal region 21 having a first IR substance, an areal region 22 having a second IR substance, the areal regions 51, 52 without IR substance, and an areal region 25 in which the areal regions 21, 22 overlap. The overlap region 25 is not necessarily a region in which the areal regions 21, 22 are in physical contact with each other. Rather, the areal regions 21, 22 can be present spaced apart from each other, but arranged one above the other such that the IR absorption of the IR substances located in the respective regions are detected simultaneously by a detection apparatus.

FIG. 4B illustrates that for a coding according to the invention not only the type and arrangement of IR-absorbing substances within a particular region can be utilized, but that there can additionally be present a "sub-coding" within the areal regions in which a particular IR substance is located. FIG. 4B represents a coding region 10 which has areal regions 26, 26' having a first IR substance and areal regions 27, 27' having a second IR substance, between the regions having IR substance there being located an areal region 23 without IR substance. In each of the areal regions 26, 26', 27, 27' there is a gradient with regard to the amount or concentration of the IR substance. A larger amount of IR substance is respectively indicated by a denser shading. Such a gradient in the amount can be achieved by a non-uniform print of the IR substances, for example by means of printing plates with varying engraving depth.

Alternatively, regions with the same IR substance, for example the partial regions 31, 32, 33, 34, 35, 36 in FIG. 3B, may respectively have different amounts of the same IR substance. This can also be achieved by printing plates that have different engraving depths in the corresponding regions. According to a further embodiment, merely the impression of a particular IR substance being present in various regions in different amounts can be conveyed to a detection apparatus. This can be achieved, for example, by equipping regions which contain a particular IR substance in the same amount with a more or less strongly IR-absorbing overprint. Alternatively, more or less of an IR absorbent can be added to the IR substance applied to particular regions.

FIG. 4C shows an embodiment in which the measures represented in FIG. 4A and FIG. 4B are combined to increase the complexity of a coding. Represented are the areal regions 26, 27' described in FIG. 4B, which, however, are arranged overlapping each other, analogous to the arrangement shown in FIG. 4A. There thus arises the overlap region 28, in which the absorption of a small amount of the IR substance of the areal region 26 as well as the IR absorption of a larger amount of the IR substance of the areal region 27' is detected.

FIGS. 5A to 5E are representations as in FIG. 2, which, however, respectively have a machine-readable security feature according to the invention. Described is respectively a partial region (partial region 5', cross-section along the line A-A' in FIG. 1) of a security element 5 according to the invention.

All represented security elements have a machine-readable security feature that forms a code by means of a first IR substance 17 and by means of a second IR substance 18. The security elements differ with regard to the locations at which the first IR substance 17 and the second IR substance 18 are arranged in the layer construction of the security element 5.

Figure 5A:
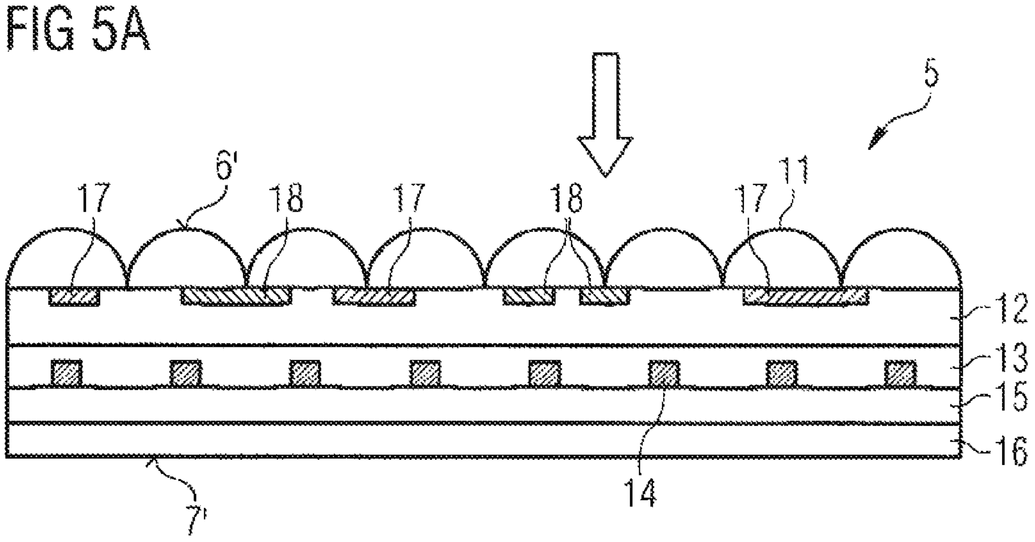

In the case of the security element represented in FIG. 5A, both the first IR substance 17 and the second IR substance 18 are located in depressions of the spacer layer 12, i.e. both IR substances are located at the same level within the layer construction, and both IR substances are located at the front side or upper side 6' of the security element 5. In this embodiment, the read-out of the machine-readable security feature is effected from the front side (the side with focusing elements 11) of the security element, as indicated by the unfilled arrow.

Figure 5B:
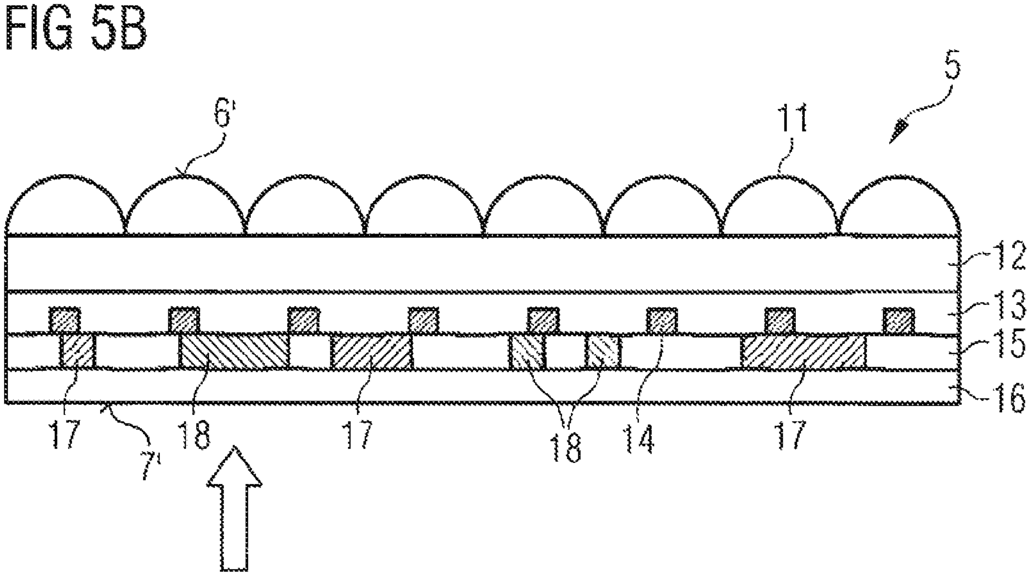

In the case of the security element 5 represented in FIG. 5B, the first IR substance 17 and the second IR substance 18 are both located in the functional layer 15, i.e. at the same level within the layer construction of the security element, and close to the back side or underside 7' of the security element. In this embodiment, it may be more expedient when the read-out of the machine-readable security feature is effected from the back side of the security element, as indicated by the unfilled arrow.

Figure 5C:
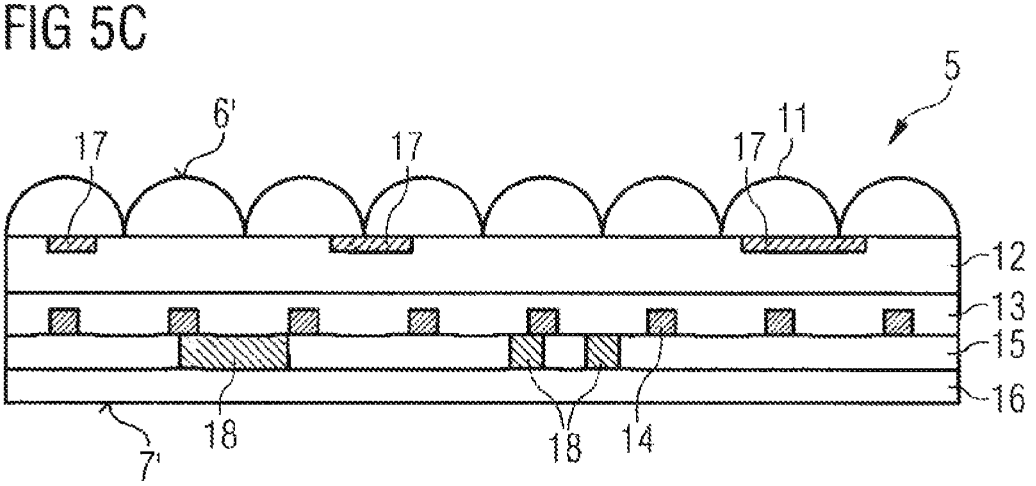

In the security element represented in FIG. 5C, the components of the machine-readable security feature are located in various layers of the security element 5. The first IR substance 17 is located in depressions of the spacer layer 12, and the second IR substance 18 is located in the functional layer 15. Depending on the materials used or the IR absorption properties thereof, it may be that upon a read-out of the machine-readable security feature from the front side 6' of the security element only the IR absorption of the first IR substance 17 is detected, while upon a read-out from the back side 7' of the security element only the IR absorption of the second IR substance 18 is detected. This detectability on only one side of the security element at a time can be utilized as an additional authenticity criterion.

Figure 5D:
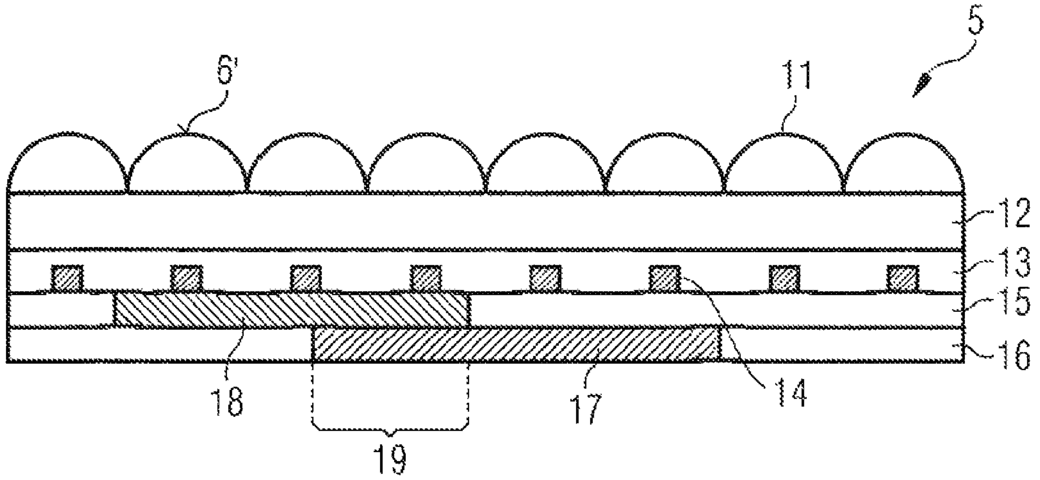
Figure 5E:
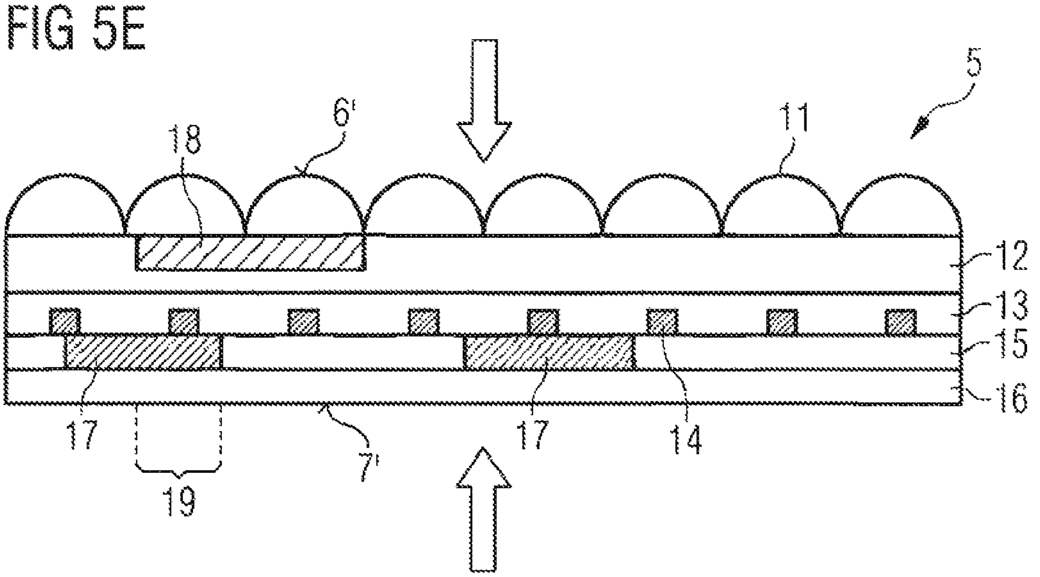

In the security elements represented in FIGS. 5D and 5E, the first IR substance 17 and the second IR substance 18 are arranged such that they partially overlap each other. In the case of the security element 5 represented in FIG. 5D, the first IR substance 17 is located in the adhesive layer 16, and the second IR substance 18 is located in the functional layer 15. The first IR substance 17 and the second IR substance 18 contact each other in the overlap region 19.

In contrast, in the security element represented in FIG. 5E, the first IR substance 17 and the second IR substance 18 are not located in adjacent layers of the security element 5. Rather, the first IR substance 17 is located in the functional layer 15, and the second IR substance 18 is located in the spacer layer 12. In perpendicular plan view of the front side 6' or the back side 7' of the security element, indicated by the unfilled arrows, there arises nevertheless a region 19 in which the regions of the first IR substance 17 and of the second IR substance 18 overlap. In this overlap region 19, the IR absorptions of the first IR substance 17 and of the second IR substance 18 are detected together by an IR detector.

The invention has been described above using the example of security elements with microlens arrangements. However, it is understood that the multicoding based on IR substances according to the invention is suitable for any type of security element or value document, if care is taken that in the regions that must be accessible for detecting the IR substances no materials are used that attenuate the intensities to be measured too much. This can usually be easily achieved by providing the IR substances in near-surface regions of a security element. "Critical" components of a security element, which in particular include metallizations present in many security features, for example in holograms and thin-film elements, do not have a negative effect on the detectability of the multicoding according to the invention, if the coding IR substances are arranged in the layer construction of a security element in such a way that during detection none of the critical components of the security element lies in the beam path.

The multicoding according to the invention is suitable for security elements and value documents with substrates made of polymer materials and on the basis of paper, and also for hybrid substrates (e.g. foil/paper/foil composite substrates or paper/foil/paper composite substrates). It not only enables a reliable authenticity check of the value documents equipped therewith, but also a denomination recognition of bank notes. Furthermore, by the use of several IR substances, which must also be applied at very specific locations and in a very specific pattern, a high degree of forgery resistance is achieved. In particular overlapping regions of the IR-absorbing substances are difficult to recognize as such for a forger and are therefore particularly difficult to imitate. The mere fact that the multicoding according to the invention is practically unrecognizable in visible light achieves a certain degree of forgery resistance, since a potential forger assumes that the securing of the authenticity is to be guaranteed by the visible security element whose appearance is not influenced by the multicoding according to the invention.

The invention claimed is:

1. A security element having an optically variable security feature and a machine-readable security feature, which are at least partially arranged one above the other,
- wherein the security element is transparent or translucent to wavelengths of visible light at least in the region of the optically variable security feature and
- the machine-readable security feature forms a code,
- wherein the machine-readable security feature is a combination of at least two different substances, a first IR substance and a second IR substance,
- wherein the first IR substance is arranged in a first areal region of the security element and the second IR substance is arranged in a second areal region of the security element which is different from the first areal region, and
- the first IR substance absorbs in a first IR wavelength region and the second IR substance absorbs in a second IR wavelength region which is distinguishable by machine from the first IR wavelength region,
- wherein the security element has at least one areal region in which the first IR substance and the second IR substance are present in the form of a mixture.

2. The security element according to claim 1, wherein the first areal region and the second areal region overlap each other in at least one overlapping region.

3. The security element according to claim 1, wherein it has at least one substance absorbing in the UV wavelength region.

4. The security element according to claim 1, wherein the first IR substance and the second IR substance are both arranged in a spacer layer at the same level within a layer construction of the security element.

5. The security element according to claim 1, wherein the first IR substance and the second IR substance are both arranged in a functional layer at the same level within a layer construction of the security element.

6. The security element according to claim 1, wherein the first IR substance is arranged in a spacer layer within a layer construction of the security element and the second IR substance is arranged in a functional layer within a layer construction of the security element.

7. The security element according to claim 1, wherein it has a layer construction with several layers,
- wherein the first IR substance and the second IR substance are arranged in the same layer or in different layers of the layer construction.

8. The security element according to claim 1, wherein the first IR substance and/or the second IR substance is an iron or a copper compound.

9. The security element according to claim 1, wherein the first areal region having the first IR substance and/or the second areal region having the second IR substance has been produced using a printing ink which is selected from SICPTALK® CBA, NFB, ETM and SEN/SEL printing inks.

10. The security element according to claim 1, wherein the optically variable security feature is a moiré magnifier.

11. The security element according to claim 1, wherein it is a security thread, a security strip, a foil patch or an independent value document.

12. A value document, wherein it is equipped with a security element according to claim 1.

13. A security element having an optically variable security feature and a machine-readable security feature, which are at least partially arranged one above the other,
- wherein the security element is transparent or translucent to wavelengths of visible light at least in the region of the optically variable security feature and
- the machine-readable security feature forms a code,
- wherein the machine-readable security feature is a combination of at least two different substances, a first IR substance and a second IR substance,
- wherein the first IR substance is arranged in a first areal region of the security element and the second IR substance is arranged in a second areal region of the security element which is different from the first areal region, and
- the first IR substance absorbs in a first IR wavelength region and the second IR substance absorbs in a second IR wavelength region which is distinguishable by machine from the first IR wavelength region,
- wherein the first areal region and/or the second areal region is divided into at least two partial regions,
- wherein the IR absorption intensity of at least two partial regions of the first areal region and/or of at least two partial regions of the second areal region is different.

14. A security element having an optically variable security feature and a machine-readable security feature, which are at least partially arranged one above the other,
- wherein the security element is transparent or translucent to wavelengths of visible light at least in the region of the optically variable security feature and
- the machine-readable security feature forms a code,
- wherein the machine-readable security feature is a combination of at least two different substances, a first IR substance and a second IR substance, wherein the first IR substance is arranged in a first areal region of the security element and the second IR substance is arranged in a second areal region of the security element which is different from the first areal region, and the first IR substance absorbs in a first IR wavelength region and the second IR substance absorbs in a second IR wavelength region which is distinguishable by machine from the first IR wavelength region, wherein the first areal region and/or the second areal region is divided into at least two partial regions, wherein the IR absorption intensity within at least one partial region varies in a location-dependent manner.

* * * * *